(12) United States Patent
Yli-Tuomi et al.

(10) Patent No.: US 9,455,843 B2
(45) Date of Patent: Sep. 27, 2016

(54) METHOD AND APPARATUS FOR EMERGENCY CALL HANDLING

(75) Inventors: Ilkka Yli-Tuomi, Oulu (FI); Jarkko Koskela, Oulu (FI); Pasi Laitinen, Oulunsalo (FI); Juha Kinnunen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 97 days.

(21) Appl. No.: 13/580,614

(22) PCT Filed: Mar. 19, 2010

(86) PCT No.: PCT/IB2010/051212
§ 371 (c)(1),
(2), (4) Date: Aug. 22, 2012

(87) PCT Pub. No.: WO2011/114193
PCT Pub. Date: Sep. 22, 2011

(65) Prior Publication Data
US 2012/0309338 A1   Dec. 6, 2012

(51) Int. Cl.
*H04M 11/04*   (2006.01)
*H04L 12/64*   (2006.01)
*H04W 4/22*   (2009.01)
*H04W 76/00*   (2009.01)
*H04W 48/20*   (2009.01)

(52) U.S. Cl.
CPC ............ *H04L 12/6418* (2013.01); *H04W 4/22* (2013.01); *H04W 76/007* (2013.01); *H04W 48/20* (2013.01)

(58) Field of Classification Search
CPC .. H04W 64/00; H04W 64/003; G01C 21/00; H01S 1/024; G01S 5/0036
USPC ............................................... 455/404.1, 521
See application file for complete search history.

(56) References Cited

U.S. PATENT DOCUMENTS

| 6,850,599 | B2 |    | 2/2005  | Yoshitani     |           |
|-----------|-----|----|---------|---------------|-----------|
| 8,165,559 | B1 | *  | 4/2012  | Klesper et al.| 455/404.1 |
| 2004/0242191 | A1 | * | 12/2004 | Hossain | H04W 4/22 455/404.1 |

(Continued)

FOREIGN PATENT DOCUMENTS

| CN | 1853424 A   | 10/2006 |
|----|-------------|---------|
| CN | 101521867 A | 9/2009  |

(Continued)

OTHER PUBLICATIONS

"3rd Generation Partnership Project; Technical Specification Group Radio Access Network; Evolved Universal Terrestrial Radio Access (E-UTRA) Radio Resource Control (RRC); Protocol Specification (Release 8)", 3GPP TS 36.331, V8.8.0, Dec. 2009, pp. 1-211.

(Continued)

*Primary Examiner* — Charles Appiah
*Assistant Examiner* — Edward Zhang
(74) *Attorney, Agent, or Firm* — Mintz Levin Cohn Ferris Glovsky and Popeo, P.C.

(57) ABSTRACT

Methods, apparatus and computer program products are provided in order to facilitate improved emergency call handling procedures and, in particular, to provide improved emergency call handling procedures relative to a connection re-establishment procedure. Emergency calls may therefore be handled in an efficient and expeditious fashion, even in instances in which a connection re-establishment procedure is ongoing at the time of the initiation of the emergency call or in instances in which a connection re-establishment procedure is commenced during an emergency call.

9 Claims, 8 Drawing Sheets

(56) References Cited

U.S. PATENT DOCUMENTS

| | | | |
|---|---|---|---|
| 2005/0090224 | A1 | 4/2005 | Dorsey et al. |
| 2006/0084463 | A1* | 4/2006 | Yoo .................. H04M 1/72536 455/550.1 |
| 2008/0010093 | A1* | 1/2008 | LaPlante et al. ................. 705/3 |
| 2008/0102784 | A1 | 5/2008 | Mittal et al. |
| 2009/0075690 | A1* | 3/2009 | Roberts ................ H04W 36/14 455/552.1 |
| 2009/0186594 | A1* | 7/2009 | Kang et al. ................ 455/404.1 |
| 2010/0029274 | A1 | 2/2010 | Deshpande et al. |
| 2010/0231379 | A1* | 9/2010 | Hutzler et al. ........... 340/539.12 |
| 2010/0255807 | A1* | 10/2010 | Umatt .................... H04W 4/22 455/404.1 |

FOREIGN PATENT DOCUMENTS

| | | |
|---|---|---|
| CN | 101521867 A | 9/2009 |
| WO | 2008/148213 A1 | 12/2008 |
| WO | WO-2008148213 A1 | 12/2008 |

OTHER PUBLICATIONS

"Clarification on RRC Connection Re-Establishment for Emergency Calls", 3GPP TSG-RAN2 Meeting #68bis, R2-100788, HTC Corporation, Jan. 18-22, 2010, 3 pages.

International Search Report and Written Opinion received for corresponding International Patent Application No. PCT/IB2010/051212, dated Dec. 10, 2010, 13 pages.

* cited by examiner

METHOD AND APPARATUS FOR EMERGENCY CALL HANDLING

RELATED APPLICATION

This application was originally filed as PCT Application No. PCT/IB2010/051212 filed Mar. 19, 2010.

TECHNOLOGICAL FIELD

Embodiments of the present invention relate generally to emergency call handling procedures and, more particularly, to emergency call handling procedures in conjunction with a connection re-establishment procedure.

BACKGROUND

In instances in which a radio resource control (RRC) connection has been lost, an RRC connection re-establishment procedure may be conducted in an effort to re-establish the lost connection. The connection re-establishment procedure searches for a cell, such as a base station, e.g., an eNode B (eNB), that is suitable for supporting the radio connection. In this regard, a suitable cell is generally defined as a cell for which the mobile terminal has access privileges, such as a cell operated by or otherwise under the control of the network operator with which the mobile terminal is associated.

By way of an example, the Evolved Universal Mobile Telecommunication System (UMTS) Terrestrial Radio Access Network (E-UTRAN), which is also known as Long Term Evolution (LTE) or 3.9 G includes a cell selector timer that dictates the length of time that is devoted to cell selection during an RRC connection re-establishment procedure. In this regard, the timer may be set to a predefined value, such as 30 seconds, and the mobile terminal may then search for a suitable cell to support the RRC connection re-establishment. In instances in which the timer expires prior to the mobile terminal selecting a cell, the RRC connection re-establishment procedure may be terminated. However, if the mobile terminal selects a suitable cell prior to expiration of the timer, the timer may be stopped and the RRC connection re-establishment procedure may be continued.

Mobile terminals and the underlying communications network are also configured to facilitate emergency call handling, such as 911 calls and the like. In order to facilitate emergency call handling, E-UTRAN, for example, permits a mobile terminal to select from among a wider number of cells in order to establish an RRC connection for emergency call than those from which the mobile terminal must select for an RRC connection that is to be utilized for purposes other than an emergency call. In contrast to the cells that would be considered suitable to support an RRC connection for purposes other than an emergency call, the cells that are acceptable to support an emergency call include virtually any cell with which the mobile terminal may communicate including those cells operated by different network operators. Accordingly, a mobile terminal generally need not satisfy or have the same access rights in order to utilize the cell for an emergency call, as opposed to otherwise establishing an RRC connection for other purposes with the cell.

Even though a mobile terminal may select from a wider number of cells in order to establish an emergency call as opposed to an RRC connection that is to be utilized for other purposes, it may be desirable to improve emergency call handling in at least certain situations. For example, in E-UTRAN, a mobile terminal may be unable to establish an emergency call while the timer is running during the process of selecting a cell during an RRC connection re-establishment procedure. As noted above, the timer may be set for a predefined length of time, such as 30 seconds, during which the mobile terminal searches for a suitable cell to facilitate re-establishment of the RRC connection. In some instances, a mobile terminal may be unable to identify a suitable cell for purposes of RRC connection re-establishment even though the mobile terminal could readily access one or more cells that would be acceptable for purposes of supporting an emergency call. Thus, a mobile terminal that wishes to establish an emergency call may have to await expiration of the timer in instances in which the mobile terminal is unable to identify a cell suitable for an RRC connection re-establishment even though one or more cells that are acceptable for purposes of supporting the emergency call are available. Such delays in the establishment of an emergency call may be disadvantageous since at least some emergency situations are time sensitive.

In another instance in which an emergency call was established on top of an existing RRC connection, the RRC connection re-establishment procedure may not be able to detect that the emergency call is ongoing since the establishment of the emergency call may be transparent in level 2, e.g., the level in which the RRC connection re-establishment procedure is conducted, and visible only in level 3, e.g., the non-access stratum (NAS) layer, in instances in which an RRC connection already exists that the time of the establishment of the emergency call. For example, a mobile terminal may be operating a background application that requires a network connection such that the mobile terminal has an RRC connection. In instances in which an emergency call is then placed by the mobile terminal, the preexisting RRC connection may not know of or detect the ongoing emergency call since the emergency call may be established on level 3 while the RRC connection utilized by the background application may be supported on level 2. In instances in which the RRC connection is lost and the mobile terminal wishes to recover the RRC connection with a re-establishment procedure, the initiation of the RRC connection re-establishment procedure and its search for a suitable cell with which to re-establish the RRC connection may disadvantageously interrupt the emergency call for an extended period of time.

Also, in instances in which an RRC connection has been established to support an emergency call and another packet data network (PDN) connection is then established in addition to the RRC connection, subsequent efforts to initiate an RRC connection re-establishment procedure may not be able to detect if the emergency call is ongoing. In this regard, in instances in which the emergency call has terminated while the PDN connection that is utilized for other purposes is ongoing, a subsequent RRC connection re-establishment procedure, such as to re-establish the PDN connection that was lost, may consider the emergency call to be ongoing and may select a cell that is acceptable for purposes of supporting an emergency call, but is not suitable for RRC connection re-establishment since, for example, the mobile terminal may not have appropriate access rights to utilize the cell for a PDN connection for purposes other than an emergency call. In this regard, efforts by the mobile terminal to re-establish an RRC connection utilizing a cell that is acceptable for purposes of supporting an emergency call, but that is not necessarily suitable for supporting RRC connection re-establishment for purposes other than an emergency call is likely to fail in that the cell will not have context data associated with the mobile terminal, as is required in order to successfully re-establish an RRC connection. Selection of a cell that is acceptable for purposes of supporting an RRC connection for an emergency call, but not necessarily suitable for RRC connection re-establishment for purposes other than an emergency call may delay the mobile terminal from successfully re-establishing the RRC connection, at least until the mobile terminal performs another search of cells on all frequencies on all radio access technologies (RATs). Moreover, by failing to re-establish the RRC connection with the cell that is otherwise acceptable for purposes of supporting an RRC connection for an emergency call, the efforts to re-establish an RRC connection may fail so as to further delay efforts by the mobile terminal to recover from radio link issues, such as those which caused the initial RRC connection to be lost.

BRIEF SUMMARY

Methods, apparatus and computer program products are provided in accordance with embodiments of the present invention to provide improved emergency call handling procedures and, in particular, to provide improved emergency call handling procedures relative to a connection re-establishment procedure. As such, emergency calls may be handled in an expeditious fashion in accordance with embodiments of the present invention, even in instances in which a connection re-establishment procedure is ongoing at the time of the initiation of the emergency call or in instances in which a connection re-establishment procedure is commenced during an emergency call.

In one embodiment, a method is provided in which a status indication regarding an emergency call is received. The status indication may be an indication that the emergency call is to be initiated or an indication that the emergency call has been released. A method of this embodiment also utilizes a shorter cell selection timer for a connection re-establishment procedure during an ongoing emergency call than in an instance in which an emergency call is not ongoing. The setting for the shorter cell selection timer may have been received from the network.

In one embodiment, the status indication that the emergency call is to be initiated is received during a connection re-establishment procedure such that utilization of the shorter cell selection timer requires switching from a longer cell selection timer utilized for the connection re-establishment procedure in an instance in which an emergency call is not ongoing to the shorter cell selection timer. The method of one embodiment may also determine if the remaining time on the longer cell selection timer exceeds the shorter cell selection timer and then only switch from the longer cell selection timer to the shorter cell selection timer in an instance in which the remaining time on the longer cell selection timer exceeds the shorter cell selection timer. As such, the shorter cell selection timer may be based upon the longer cell selection time. Or, the shorter cell selection timer may be defined in another manner, such as by being set to a predefined value.

In another embodiment, a method is provided that receives an indication that an emergency call is to be initiated during an ongoing connection or during a connection re-establishment procedure. In response to the indication that the emergency call is to be initiated, the ongoing connection or the connection re-establishment procedure is terminated without awaiting expiration of the cell selection timer. Another connection is then established to support the emergency call. Upon termination of the emergency call, the another connection that has been established may be released.

The ongoing connection or the connection re-establishment procedure may be terminated by being moved to an idle state. Additionally or alternatively, the ongoing connection may be terminated without signaling the network. During the ongoing emergency call, the method of one embodiment may utilize a shorter cell selection timer for a connection re-establishment procedure than that utilized in instances in which an emergency call is not ongoing.

In yet another embodiment, a method is provided in which an indication that an emergency call is to be initiated is received during a connection re-establishment procedure during which cell selection is being performed to identify a cell that is suitable to support a connection. In response to receiving the indication that an emergency is to be initiated, cell selection is then conducted to identify a cell that is acceptable to support the emergency call. In this regard, the cell selection that is conducted to identify an acceptable call may consider one or more cells that would be acceptable to support the emergency call, but would not be suitable to support the connection sought to be re-established. The cell selection that is conducted in response to receiving the indication that an emergency call is to be initiated may be commenced without completion of the connection re-establishment procedure. As a result of having conducted cell selection, a connection may be established to support the emergency call with a cell that is acceptable to support the emergency call, but that would not be suitable to support the connection sought to be re-established.

In a further embodiment, a method is provided that receives an indication that connection re-establishment has been triggered during an ongoing emergency call. In response to the indication that connection re-establishment has been triggered, the method of this embodiment moves to an idle state so as to require a user to initiate another emergency call. In this regard, movement to the idle state may occur without awaiting expiration of a cell selection timer.

A method of an additional embodiment is also provided that receives an indication that an emergency call is to be initiated by mobile terminal. The method of this embodiment then causes one or more parameters to be provided to the mobile terminal. The one or more parameters may include a setting for a cell selection timer. In instances in which there is an ongoing connection when the indication is received that an emergency call is to be initiated, the ongoing connection may be released prior to initiating the emergency call. The setting for the cell selection timer may be less than the setting for the cell selection timer that is utilized for a connection re-establishment procedure in an instance in which an emergency call is not ongoing. In one embodiment, the setting for the cell selection timer is no more than 5 seconds, such as no more than 3 seconds.

An apparatus is provided in accordance with one embodiment that includes at least one processor and at least one memory including computer program code. The at least one memory and the computer program code are configured to, with the at least one processor, cause the apparatus at least to receive a status indication regarding an emergency call. The status indication may be an indication that the emergency call is to be initiated or an indication that the emergency call has been released. The apparatus of this embodiment may also be caused to utilize a shorter cell selection timer for a connection re-establishment procedure during an ongoing emergency call than in an instance in which an emergency call is not ongoing. The setting for the shorter cell selection timer may have been received from the network.

In one embodiment, the status indication that the emergency call is to be initiated is received during a connection re-establishment procedure such that utilization of the shorter cell selection timer requires the apparatus being caused to switch from a longer cell selection timer utilized for the connection re-establishment procedure in an instance in which an emergency call is not ongoing to the shorter cell selection timer. The apparatus of one embodiment may also be caused to determine if the remaining time on the longer cell selection timer exceeds the shorter cell selection timer and then only switch from the longer cell selection timer to the shorter cell selection timer in an instance in which the remaining time on the longer cell selection timer exceeds the shorter cell selection timer. As such, the shorter cell selection timer may be based upon the longer cell selection time. Or, the shorter cell selection timer may be defined in another manner, such as by being set to a predefined value.

In another embodiment, an apparatus is provided that includes at least one processor and at least one memory including computer program code. The at least one memory and the computer program code are configured to, with the at least one processor, cause the apparatus at least to receive an indication that an emergency call is to be initiated during an ongoing connection or during a connection re-establishment procedure. In response to the indication that the emergency call is to be initiated, the apparatus of this embodiment may be caused to terminate the ongoing connection or the connection re-establishment procedure without awaiting expiration of the cell selection timer. The apparatus may then be caused to establish another connection to support the emergency call. Upon termination of the emergency call, the apparatus of this embodiment may be caused to release the another connection that has been established.

An apparatus is provided in accordance with another embodiment that includes at least one processor and at least one memory including computer program code. The at least one memory and the computer program code are configured to, with the at least one processor, cause the apparatus at least to terminate the ongoing connection or the connection re-establishment procedure by being moved to an idle state. Additionally or alternatively, the apparatus may be configured to terminate the ongoing connection without signaling the network. During the ongoing emergency call, the apparatus of one embodiment may be caused to utilize a shorter cell selection timer for a connection re-establishment procedure than that utilized in instances in which an emergency call is not ongoing.

In yet another embodiment, an apparatus is provided that includes at least one processor and at least one memory including computer program code. The at least one memory and the computer program code are configured to, with the at least one processor, cause the apparatus at least to receive an indication that an emergency call is to be initiated during a connection re-establishment procedure during which cell selection is being performed to identify a cell that is suitable to support a connection. In response to receiving the indication that an emergency is to be initiated, the apparatus may be caused to conduct cell selection to identify a cell that is acceptable to support the emergency call. In this regard, the cell selection that is conducted to identify an acceptable call may consider one or more cells that would be acceptable to support the emergency call, but would not be suitable to support the connection sought to be re-established. The cell selection that is conducted in response to receiving the indication that an emergency call is to be initiated may be commenced without completion of the connection re-establishment procedure. As a result of having conducted cell selection, the apparatus may be caused to establish a connection to support the emergency call with a cell that is acceptable to support the emergency call, but that would not be suitable to support the connection sought to be re-established.

In a further embodiment, an apparatus is provided that includes at least one processor and at least one memory including computer program code. The at least one memory and the computer program code are configured to, with the at least one processor, cause the apparatus at least to receive an indication that connection re-establishment has been triggered during an ongoing emergency call. In response to the indication that connection re-establishment has been triggered, the apparatus may move to the idle state so as to require a user to initiate another emergency call. In this regard, the movement to the idle state may occur without awaiting expiration of a cell selection timer.

An apparatus of an additional embodiment is also provided that includes at least one processor and at least one memory including computer program code. The at least one memory and the computer program code are configured to, with the at least one processor, cause the apparatus at least to receive an indication that an emergency call is to be initiated by mobile terminal. The apparatus of this embodiment may be configured to cause one or more parameters to be provided to the mobile terminal. The one or more parameters may include a setting for a cell selection timer. In instances in which there is an ongoing connection when the indication is received that an emergency call is to be initiated, the apparatus may cause the ongoing connection to be released prior to initiating the emergency call. The setting for the cell selection timer may be less than the setting for the cell selection timer that is utilized for a connection re-establishment procedure in an instance in which an emergency call is not ongoing. In one embodiment, the setting for the cell selection timer is no more than 5 seconds, such as no more than 3 seconds.

A computer program product is provided in accordance with one embodiment that includes at least one computer-readable storage medium having computer-executable program code instructions stored therein. The computer-executable program code instructions of this embodiment may include program code instructions for receiving a status indication regarding an emergency call. The status indication may be an indication that the emergency call is to be initiated or an indication that the emergency call has been released. A computer-executable program code instructions may also include program code instructions for utilizing a shorter cell selection timer for a connection re-establishment procedure during an ongoing emergency call than in an instance in which an emergency call is not ongoing. The setting for the shorter cell selection timer may have been received from the network.

In one embodiment, the status indication that the emergency call is to be initiated is received during a connection re-establishment procedure such that the program code instructions for utilizing the shorter cell selection timer includes program code instructions for switching from a longer cell selection timer utilized for the connection re-establishment procedure in an instance in which an emergency call is not ongoing to the shorter cell selection timer. The computer-executable program code instructions of one embodiment may also include program code instructions for determining if the remaining time on the longer cell selection timer exceeds the shorter cell selection timer and then only switching from the longer cell selection timer to the shorter cell selection timer in an instance in which the remaining time on the longer cell selection timer exceeds the shorter cell selection timer. As such, the shorter cell selection timer may be based upon the longer cell selection time. Or, the shorter cell selection timer may be defined in another manner, such as by being set to a predefined value.

In another embodiment, a computer program product is provided that includes at least one computer-readable storage medium having computer-executable program code instructions stored therein. The computer-executable program code instructions of this embodiment may include program code instructions for receiving an indication that an emergency call is to be initiated during an ongoing connection or during a connection re-establishment procedure. In response to the indication that the emergency call is to be initiated, the computer-executable program code instructions may include program code instructions for terminating an ongoing connection or the connection re-establishment procedure without awaiting expiration of the cell selection timer. The computer-executable program code instructions may also include program code instructions for establishing another connection to support the emergency call. Upon termination of the emergency call, program code instructions may be provided to release the another connection that has been established.

The program code instructions of one embodiment move the ongoing connection or the connection re-establishment procedure to an idle state in order to provide for termination. Additionally or alternatively, the program code instructions may terminate an ongoing connection without signaling the network. During the ongoing emergency call, the program code instructions of one embodiment may utilize a shorter cell selection timer for a connection re-establishment procedure than that utilized in instances in which an emergency call is not ongoing.

In yet another embodiment, a computer program product is provided that includes at least one computer-readable storage medium having computer-executable program code instructions stored therein. The computer-executable program code instructions of this embodiment may include program code instructions for receiving an indication that an emergency call is to be initiated during a connection re-establishment procedure during which cell selection is being performed to identify a cell that is suitable to support a connection. In response to receiving the indication that an emergency is to be initiated, program code instructions may be provided to conduct cell selection to identify a cell that is acceptable to support the emergency call. In this regard, the cell selection that is conducted to identify an acceptable call may consider one or more cells that would be acceptable to support the emergency call, but would not be suitable to support the connection sought to be re-established. The program code instructions may commence the cell selection that is conducted in response to receiving the indication that an emergency call is to be initiated without completion of the connection re-establishment procedure. As a result of having conducted cell selection, program code instructions may be provided to establish a connection to support the emergency call with a cell that is acceptable to support the emergency call, but that would not be suitable to support the connection sought to be re-established.

In a further embodiment, a computer program product is provided that includes at least one computer-readable storage medium having computer-executable program code instructions stored therein. The computer-executable program code instructions of this embodiment may include program code instructions for receiving an indication that connection re-establishment has been triggered during an ongoing emergency call. In response to the indication that connection re-establishment has been triggered, program code instructions are provided to move to an idle state so as to require a user to initiate another emergency call. In this regard, the movement to the idle state may occur without awaiting expiration of a cell selection timer.

A computer program product is provided in accordance with one embodiment that includes at least one computer-readable storage medium having computer-executable program code instructions stored therein. The computer-executable program code instructions of this embodiment may include program code instructions for receiving an indication that an emergency call is to be initiated by mobile terminal. Program code instructions may also be provided for causing one or more parameters to be provided to the mobile terminal. The one or more parameters may include a setting for a cell selection timer. In instances in which there is an ongoing connection when the indication is received that an emergency call is to be initiated, program code instructions may be provided for releasing the ongoing connection prior to initiating the emergency call. The setting for the cell selection timer may be less than the setting for the cell selection timer that is utilized for a connection re-establishment procedure in an instance in which an emergency call is not ongoing. In one embodiment, the setting for the cell selection timer is no more than 5 seconds, such as no more than 3 seconds.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
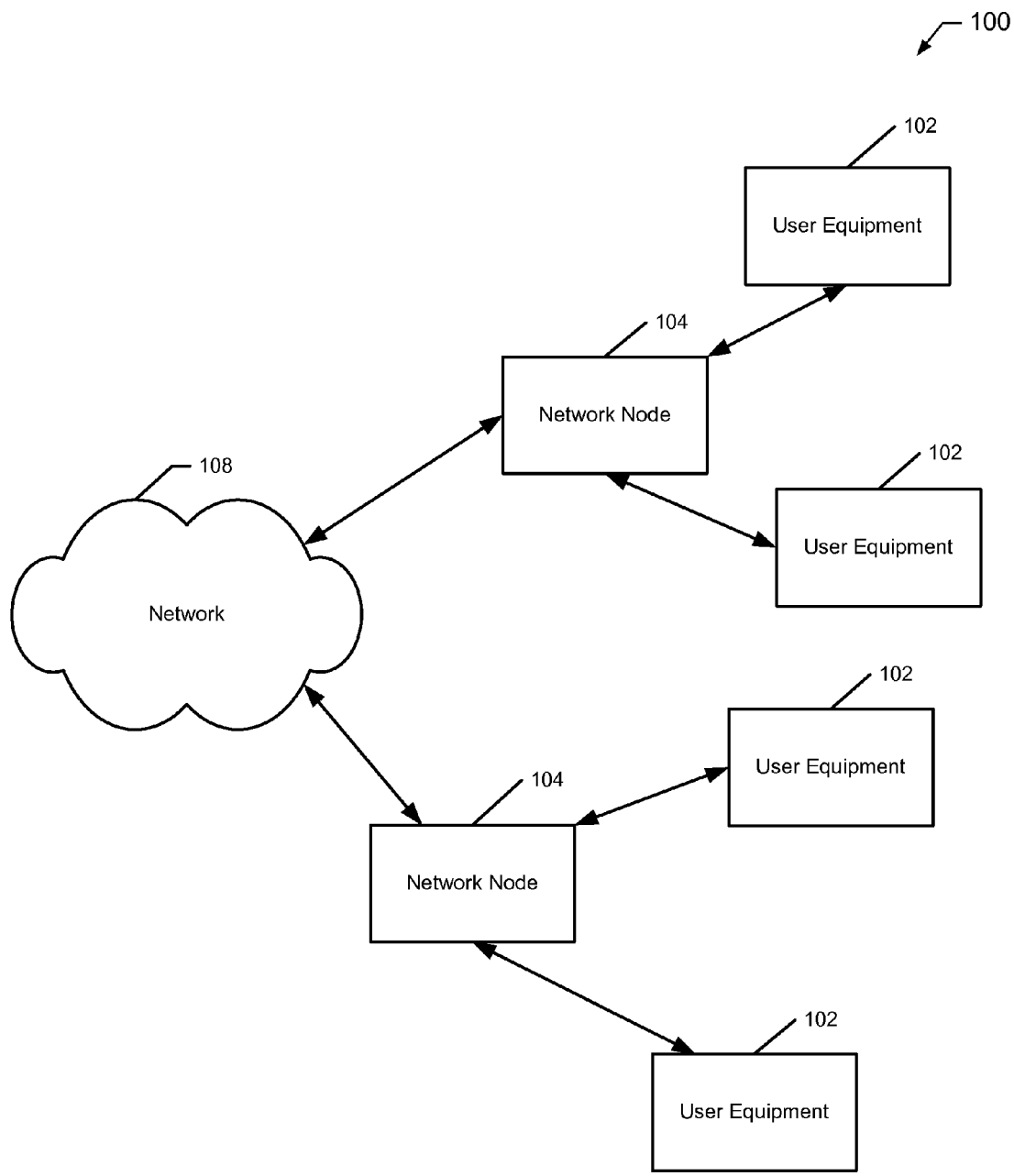
FIG. 1 is a block diagram of a system according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium' refers to a non-transitory, physical storage medium, e.g., a volatile or non-volatile memory device, and is differentiated from a 'computer-readable transmission medium', which refers to an electromagnetic signal.

FIG. 1 illustrates a block diagram of a system 100 for handling emergency calls between a mobile terminal, such as user equipment 102, and a network node 104 according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for handling emergency calls between a mobile terminal and a network node, numerous other configurations may also be used to implement embodiments of the present invention. In at least some embodiments, the system 100 includes one or more mobile terminals and one or more network nodes 104. In at least some embodiments, the system 100 further comprises a network 108. The network 108 may comprise one or more wireline networks, one or more wireless networks, or some combination thereof. In one embodiment, the network 108 comprises a public land mobile network (e.g., a cellular network), such as may be implemented by a network operator (e.g. a cellular access provider). The network 108 may operate in accordance with universal terrestrial radio access network (UTRAN) standards, evolved UTRAN (E-UTRAN) standards, GSM (Global System for Mobile communications) EDGE (Enhanced Data GSM Environment) radio access network (GERAN) standards and/or the like. It will be appreciated, however, that where references herein are made to a network standard and/or terminology particular to a network standard, the references are provided merely by way of example and not by way of limitation.

The network node 104 may comprise any network entity configured to communicate with a mobile terminal, such as user equipment 102, such as to support the establishment of a connection with the user equipment to the network node. In this regard, the network node 104 may comprise, for example, a base station (BS), such as an eNode B (eNB) in accordance with the E-UTRAN standard. As such, in some embodiments, the network node 104 is configured to provide access to the network 108 for the user equipment 102.

In operation, the network node 104 and the mobile terminal, such as user equipment 102, may establish connections for various purposes, such as for the exchange of data, to support a voice call, to support an emergency call or the like. The mobile terminal, such as the user equipment (UE), may be embodied in various forms including a desktop computer, laptop computer, mobile computer, mobile phone, mobile communication device, game device, digital camera/camcorder, audio/video player, television device, radio receiver, digital video recorder, positioning device, any combination thereof, and/or the like. In an exemplary embodiment, the user equipment 102 is one example of a mobile terminal, such as that illustrated in FIG. 2.

Figure 2:
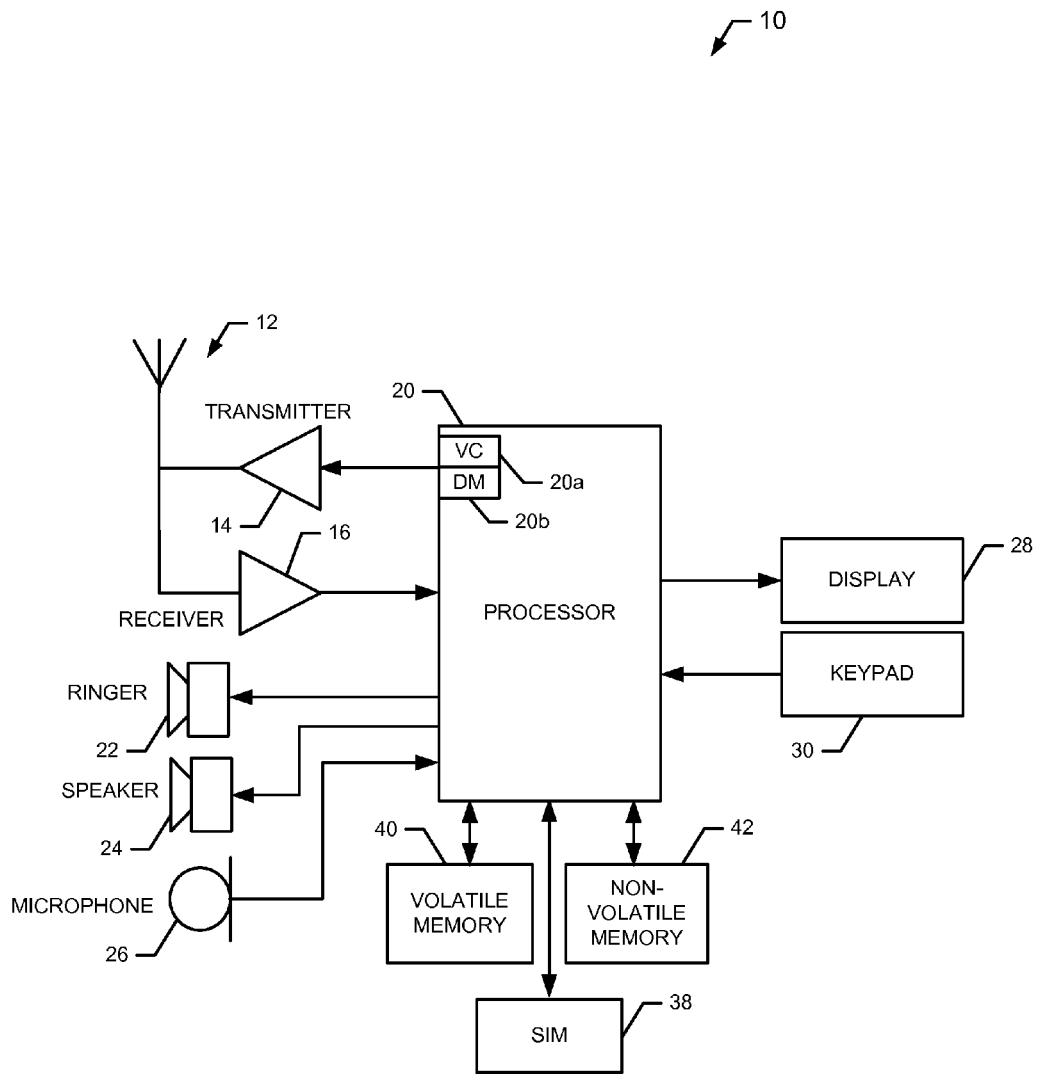
FIG. 2 is a block diagram of a mobile terminal in accordance with an example embodiment of the present invention.

In this regard, FIG. 2 illustrates a block diagram of a mobile terminal 10 which may embody, for example, the user equipment 102. It should be understood, however, that the mobile terminal 10 illustrated and hereinafter described is merely illustrative of one type of user equipment 102 that may implement and/or benefit from embodiments of the present invention and, therefore, should not be taken to limit the scope of the present invention. While one embodiment of the mobile terminal is illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. The signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as LTE, LTE-Advanced or E-UTRAN and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 10 may comprise memory, such as one or more subscriber identity modules (SIMs) 38, universal SIMs (USIMs), removable user identity modules (R-UIMs), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40, non-volatile memory 42 may include a cache area for temporary storage of data. The memories may store one or more software programs, instructions, pieces of information, data, and/or the like which may be used by the mobile terminal for performing functions of the mobile terminal. For example, the memories may store instructions which, when executed by the processor, cause the processor to perform the functions described herein. The memories may also comprise an identifier, such as an international mobile equipment identification (IMEI) code, capable of uniquely identifying the mobile terminal 10.

Figure 3:
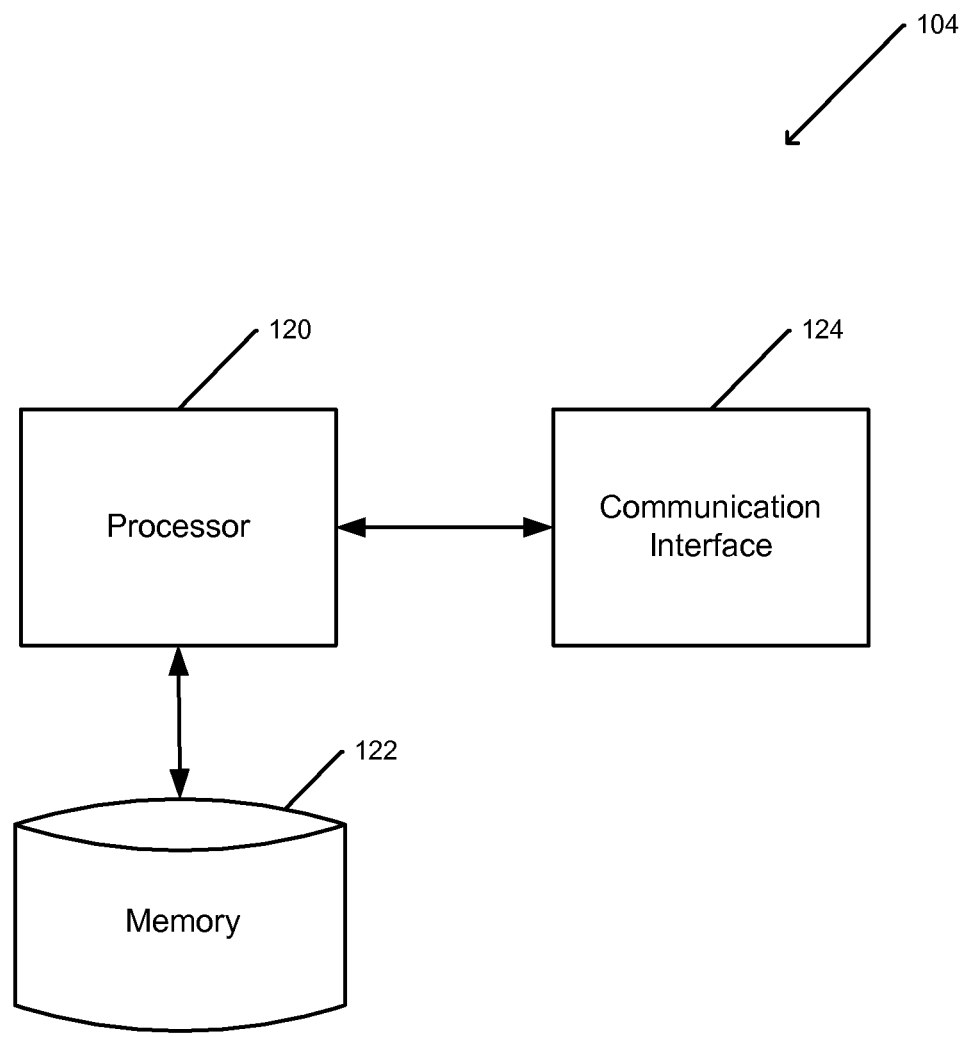
FIG. 3 is a block diagram of a network node in accordance with an example embodiment of the present invention.

Referring now to FIG. 3, a block diagram of a network node 104, such as a cell, such as a base station, e.g., an eNB, an access point or the like, is provided according to an example embodiment of the invention. In the example embodiment illustrated in FIG. 3, the network node 104 may include various means, such as a processor 120, memory 122 and communication interface 124 for performing the various functions herein described. These means of the network node 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 122) that is executable by a suitably configured processing device (for example, the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 3 as a single processor, in some embodiments the processor 120 comprises a plurality of processors. The plurality of processors may be in operative communication with each other and may be collectively configured to perform one or more functionalities of the network node 104 as described herein. In an example embodiment, the processor 120 is configured to execute instructions stored in the memory 122 or otherwise accessible to the processor 120. These instructions, when executed by the processor 120, may cause the network node 104 to perform one or more of the functionalities of the network node 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. Although illustrated in FIG. 3 as a single memory, the memory 122 may comprise a plurality of memories. In various embodiments, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, and/or the like for enabling the network node 104 to carry out various functions in accordance with example embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another entity, such as over a network. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more computing devices or entities over the network 108. The communication interface 124 may be configured to receive and/or transmit data using any protocol that may be used for communications between the network node 104 and one or more other computing devices over the network 108 (e.g., the a service provider, network access point, and/or the like). The communication interface 124 may additionally be in communication with the memory 122, such as via a bus.

Figure 4A:
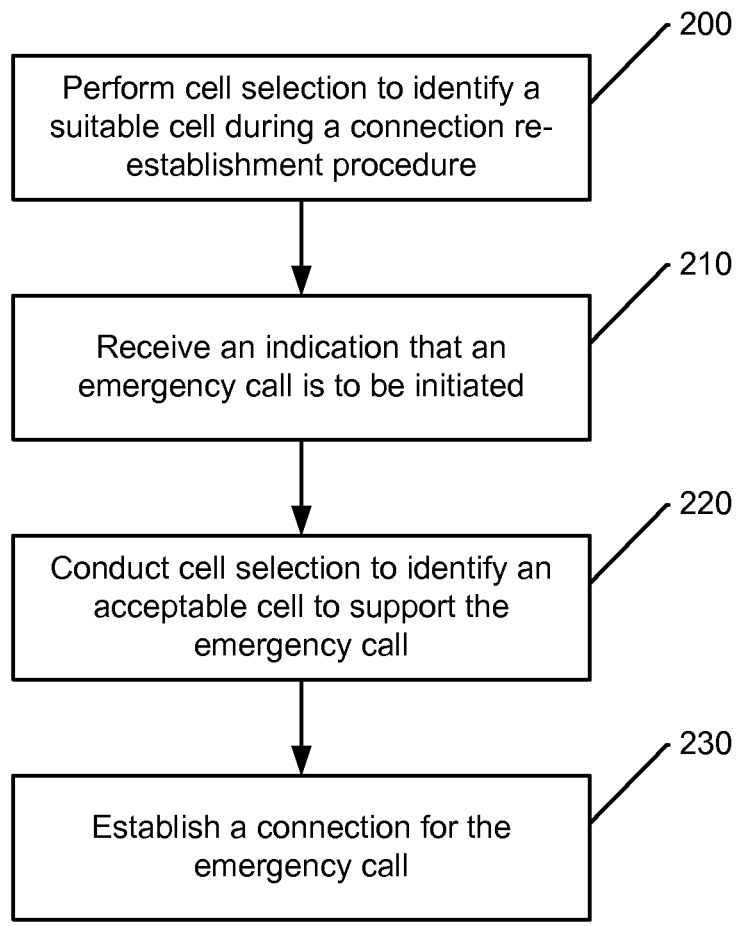
FIGS. 4A-4E are flowcharts illustrating operations performed to effectively handle an emergency call in accordance with an example embodiment of the present invention.

Embodiments of the present invention provide for improved handling of emergency calls in various scenarios including the handling of emergency calls during or otherwise in association with a connection re-establishment procedure. In one embodiment depicted in FIG. 4A, a mobile terminal 10, such as shown in FIG. 2, may be endeavoring to re-establish a prior connection, such as an RRC connection, that was lost, such as due to a link failure. As such, the mobile terminal may be engaged in a connection re-establishment procedure during which the mobile terminal is performing cell selection in order to identify a cell that is suitable for support the network connection (for purposes other than an emergency call). See operation 200 of FIG. 4A. In this embodiment, the mobile terminal may include means, such as the processor 20, receiver 16, antenna 12 and/or the like, for receiving an indication during the connection re-establishment procedure that an emergency call is to be initiated, such as a result of input provided by the user of the mobile terminal via the keypad 30. See operation 210. In response, the mobile terminal may alter the cell selection process and, as such, may include means, such as the processor, for conducting the cell selection so as to identify a cell that is acceptable to support the emergency call. See operation 220. For example, the mobile terminal, such as the processor, of one embodiment may cause level 3 that will support the emergency call to indicate to level 2 at which the connection re-establishment procedure is being conducted that an emergency call is to be initiated in order to alert level 2 as to the transition to a cell selection process intended to identify a cell that is acceptable to support an emergency call. Indeed, although communication between level 3 and level 2 is described in conjunction with at least some of the subsequent embodiments, the mobile terminal of any of the embodiments of FIGS. 4A-4E may be configured to cause level 3 to advise level 2 regarding the status of an emergency call, such as the establishment of an emergency call, the release of an emergency call or the like, so that the radio connections established or sought to be established by level 2 are appropriately coordinated with the emergency call status. In one embodiment, the transition to a cell selection process that is intended to identify a cell that is acceptable to support an emergency call is accomplished without having completed the connection re-establishment procedure.

In this regard, the cells that are suitable to support a radio connection for purposes other than an emergency call generally include those for which the mobile terminal 10 has access privileges, such as those operated by or under the control of a network operator with which the mobile terminal is associated and/or those that have context data associated with the mobile terminal, such as the identification of one or more handover target cells. However, the cells that are considered to be acceptable for purposes of supporting an emergency call generally include a larger number of cells including those that are suitable for supporting a radio connection as well as other cells for which the mobile terminal does not have access privileges, such as those operated or controlled by another network operator. Thus, the likelihood of a mobile terminal identifying a cell that is acceptable for purposes of supporting an emergency call is greater and, more likely to occur quicker than the identification of a cell that is suitable to support a radio connection for other purposes. Thus, the manner in which the mobile terminal of one embodiment conducts the cell selection to identify an acceptable cell for supporting an emergency call may include the consideration of one or more cells that would be acceptable to support the emergency call, but that would not be suitable to support the connection sought to be re-established. Once the mobile terminal has identified an acceptable cell, the mobile terminal may include means, such as the processor 20, for establishing a connection utilizing the cell that has been determined to be acceptable to support the emergency call, regardless of whether the cell may also support the connection sought to be re-established. See operation 230 of FIG. 4A.

Figure 4B:
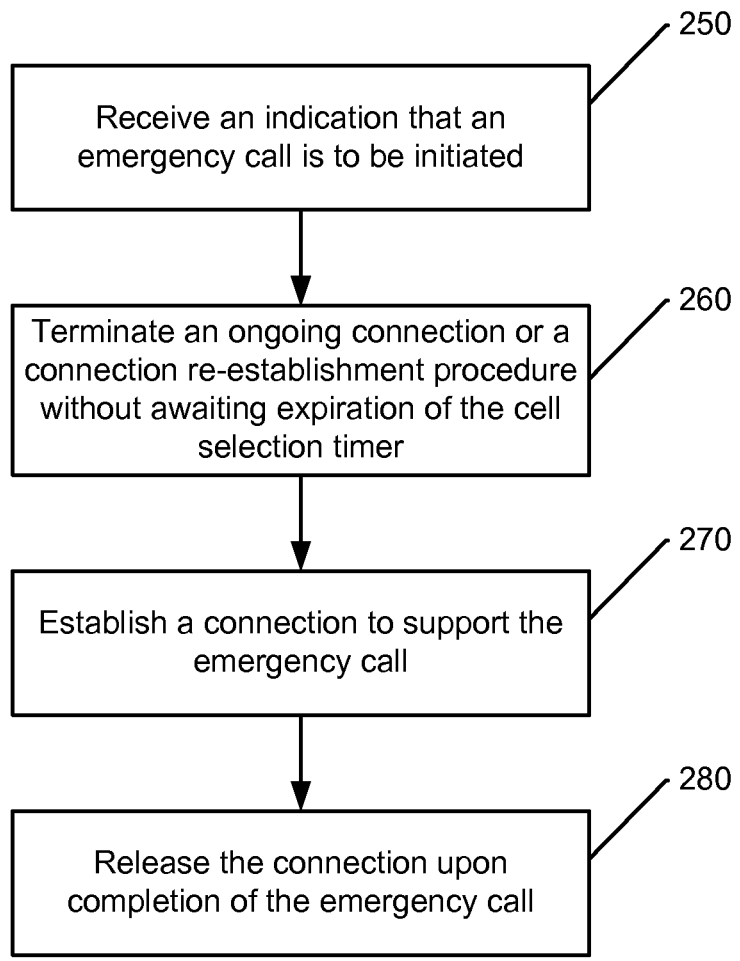
Figure 4C:
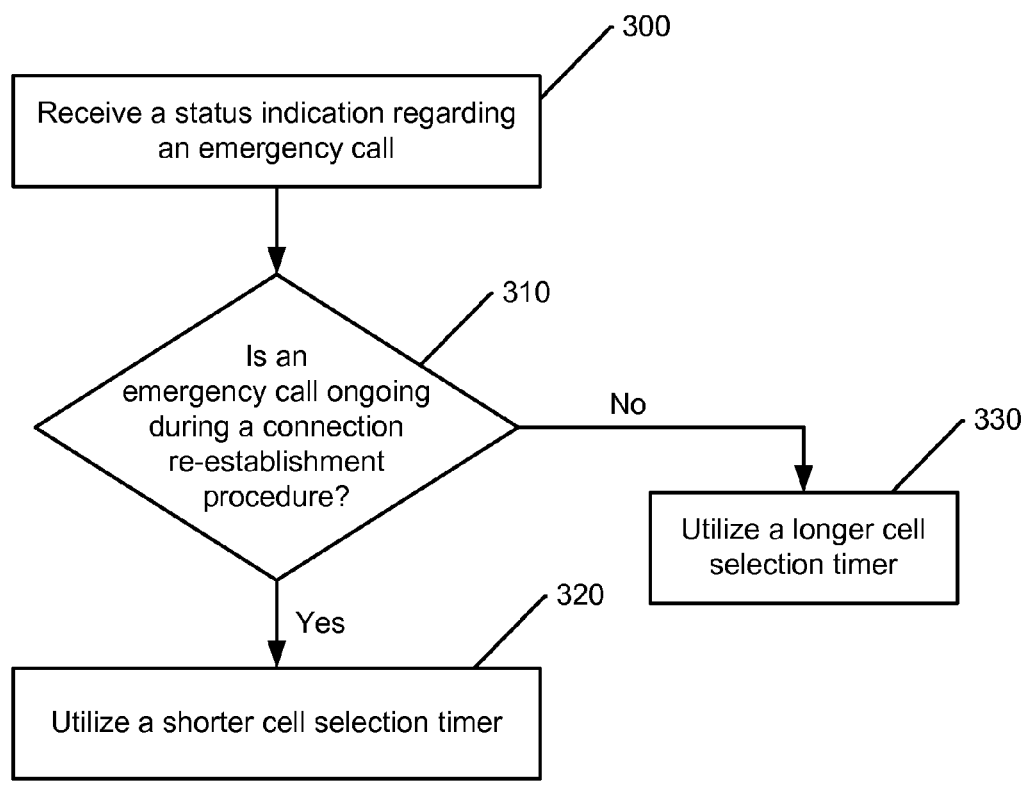

Although the embodiment described above in conjunction with FIG. 4A may attempt to re-establish the radio connection via the same cell that is identified to be acceptable in order to support an emergency call, a method and apparatus are provided according to another embodiment that simply terminates a connection re-establishment procedure in instances in which an emergency call is to be initiated. In this embodiment as shown in FIG. 4B, a mobile terminal 10 may initially have an ongoing connection or be actively engaged in a connection re-establishment procedure. The mobile terminal may include means, such as the processor 20, receiver 16, antenna 12 and/or the like, for receiving an indication while in this state, such as via user input provided via the keypad 20, that an emergency call is to be initiated. See operation 250 of FIG. 4B. In this embodiment, the mobile terminal may include means, such as the processor, for terminating the ongoing connection or the connection re-establishment procedure, such as by moving the radio connection of the mobile terminal to an idle state. See operation 260. Indeed, in instances in which the mobile terminal was engaged in a connection re-establishment procedure at the time that an indication was received that an emergency call was to be initiated, the connection re-establishment procedure may be terminated without awaiting completion of the cell selection timer. In this regard and as described in more detail below, a cell selection procedure may have an associated timer that defines the maximum period of time during which the mobile terminal may attempt to identify a suitable cell during a connection re-establishment procedure. For example, the cell selection timer may be set to 30 seconds. If the mobile terminal is unsuccessful in identifying a suitable cell with which to re-establish a connection prior to the expiration of the cell selection timer, the connection re-establishment procedure will conclude without having re-established the connection. In this embodiment, however, the receipt of an indication that an emergency call is to be initiated causes the connection re-establishment procedure to be terminated without awaiting expiration of the cell selection timer.

In instances in which the mobile terminal 10 is engaged in an ongoing connection upon receiving the indication that an emergency call is to be initiated, the mobile terminal may terminate the ongoing connection without signaling to the network 108 in order to order to facilitate the termination of the ongoing connection. For example, the mobile terminal, such as the processor 20, of one embodiment may cause level 3 upon which the emergency call is to be conducted to request that level 2 release the radio connection, or to otherwise indicate to level 2 that an emergency call is to be initiated such that the radio connection is released. As such, the radio connection may be released locally such that network signaling is avoided. Additionally, level 2 will be informed of the existence of the emergency call.

Once the ongoing connection or the connection re-establishment procedure has been terminated, another connection may be established. In this regard, the mobile terminal 10 may include means, such as a processor 20, for establishing another connection in order to support the emergency call. See operation 270. In order to establish another connection, the mobile terminal may conduct a cell selection process in order to identify a cell that is acceptable for supporting an emergency call. Once an acceptable cell is identified, another connection may be established and the emergency call may then be conducted. Thereafter, upon termination of the emergency call, the connection that has been established to support the emergency call may be terminated. See operation 280.

In another embodiment, the mobile terminal 10 may include means, such as the processor 20, receiver 16, antenna 12 and/or the like, for receiving a status indication regarding an emergency call. The status indication may indicate that an emergency call is to be initiated. Alternatively, the status indication may be an indication that an emergency call that has been ongoing is to be released. The mobile terminal may also include means, such as the processor, for selectively utilizing a cell selection timer that is set to an initial value dependent upon the status indication regarding an emergency call. In this embodiment, the mobile terminal, such as the processor, may initially determine, based upon the status indication, if an emergency call is intended to be ongoing during a connection re-establishment procedure. See operation 310. If so, the mobile terminal, such as the processor, may utilize a shorter cell selection timer for a connection re-establishment procedure conducted during an ongoing emergency call. See operation 320. In an instance in which an emergency call is not ongoing, however, the mobile terminal, such as the processor, may utilize a longer cell selection timer. See operation 330. By way of example, the cell selection timer that governs the time period during which a mobile terminal searches for a cell with which to re-establish a connection may be set to 30 seconds in instances in which an emergency is not ongoing, but set to a shorter length of time, such as 5 seconds, 3 seconds or the like during an ongoing emergency call. By utilizing a shorter cell selection timer during a connection re-establishment procedure that is to be conducted during an ongoing emergency call, efforts may be undertaken to re-establish a connection that has been lost without meaningfully interrupting an emergency call. Conversely, by utilizing a longer cell selection timer during which to search for a suitable cell in instances in which an emergency call is not ongoing, the likelihood that a suitable cell will be identified to support the re-establishment of the connection will be increased, albeit at the expense of a potential increased delay during which a suitable cell is being sought. To insure that the proper cell selection timer is utilized during a connection re-establishment procedure, the mobile terminal of one embodiment may also cause level 3 on which the emergency call is supported to advise level 2 on which the connection re-establishment procedure would be implemented as to the existence of the emergency call.

The shorter cell selection timer that may be utilized to govern connection re-establishment procedures during an ongoing emergency call may be predefined with the value of the shorter cell selection timer stored in memory 40, 42, for example. Alternatively, as described below, the value of the shorter cell selection timer may be provided by the network 108, such as in response to the network having received an indication that an emergency call is to be initiated.

In one example embodiment, the mobile terminal 10 may be engaged in a connection re-establishment procedure during which the cell selection timer is counting down from a larger initial value, such as 30 seconds. The mobile terminal may receive a status indication indicating that an emergency call is to be initiated. As such, the mobile terminal may switch from utilization of the longer cell selection timer that was being utilized during the connection re-establishment procedure to a shorter cell selection timer. As such, the connection re-establishment procedure may continue following establishment of a connection to support the emergency call. However, the connection re-establishment procedure that is conducted following establishment of an emergency call will only be permitted for a more limited period of time as defined by the shorter cell selection time so as not to meaningfully interrupt the emergency call. The shorter cell selection timer may be based upon the longer cell selection timer. For example, instead of immediately switching from the longer cell selection timer to the shorter cell section timer in response to receipt to an indication that an emergency call is to be initiated, the mobile terminal of one embodiment may include means, such as a processor 20, for initially determining if the remaining time on the cell selection timer that has been utilized during the connection re-establishment procedure is greater than the cell selection timer that would be utilized during an emergency call. In this embodiment, the mobile terminal, such as the processor, only switches to be the shorter cell selection timer in instances in which the time that remains upon the cell selection timer that was being utilized during the connection re-establishment procedure exceeds the shorter cell selection timer. Otherwise, the connection re-establishment procedure may continue to be governed by the same cell selection timer since it is relatively close to expiration and has a smaller value than the cell selection timer that otherwise would be utilized during an ongoing emergency call. Alternatively, the mobile terminal, such as the processor, may determine the shorter cell selection timer to be equal to the result of having divided the longer cell selection timer by a divisor with the divisor either having been predefined or provided by the network 108. In this alternative embodiment, the mobile terminal may initially determine if the longer cell selection timer is less than a predefined threshold. If so, the shorter cell selection timer may be set equal to the longer cell selection timer. Otherwise, the shorter cell selection timer may be set equal to the result of having divided the longer cell selection timer by a divisor.

Figure 4D:
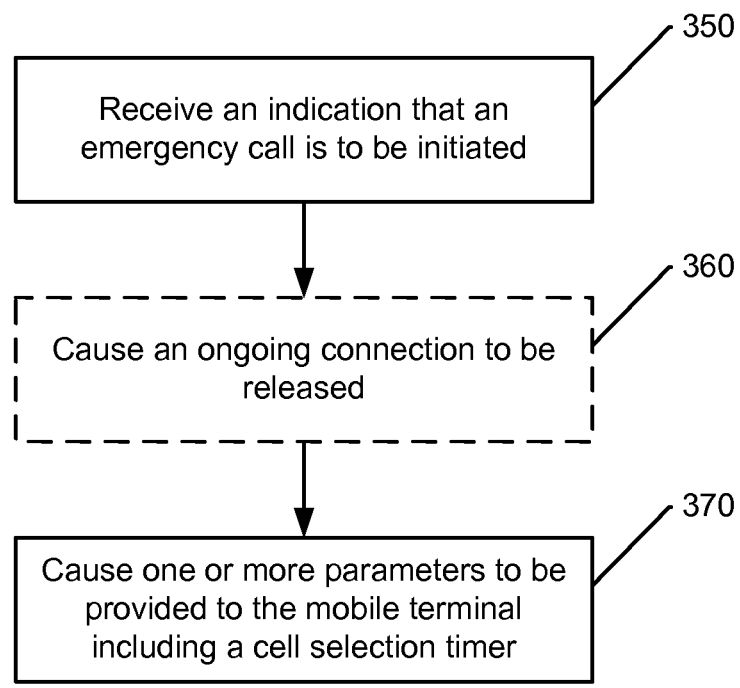
Figure 4E:
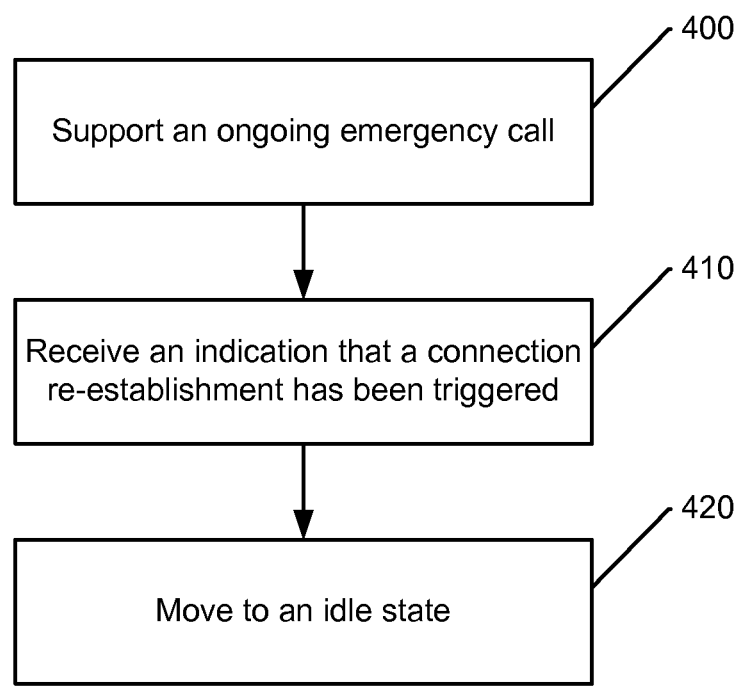

From the network perspective, a network node 104, such as a cell, e.g., a base station, an access point or the like, or other network entity, such as a mobility management entity (MME), may include means, such as a processor 120, a communication interface 124 or the like, for receiving an indication that an emergency call is to be initiated as shown, for example, in operation 350 of FIG. 4D. In instances in which a connection was ongoing between a mobile terminal 10 and the network node when the indication is received by the network node that an emergency call was to be initiated by the mobile terminal, the network node may cause the ongoing connection with the mobile terminal to be released. See operation 360. In this regard, the network node may include means, such as the processor, for causing the ongoing connection to be terminated. The network node may also include means, such as the processor, for causing one or more parameters to be provided to the mobile terminal. See operation 370. The parameters that are provided to the mobile terminal may at least partially define the manner in which the mobile terminal operations will be conducted during the emergency call. For example, the parameters may include the shorter cell selection timer that will be utilized by the mobile terminal while the emergency call is ongoing. As described above, the shorter cell selection timer defines the period of time during which the mobile terminal will search for a suitable cell to support the re-establishment of a radio connection. By defining a shorter cell selection timer, the connection re-establishment procedure may be conducted without meaningfully interrupting an ongoing emergency call. While the network node may define the shorter cell selection timer to have any predefined value, such as 5 seconds, 3 seconds or the like, the shorter cell selection timer that is utilized during a connection re-establishment procedure in an instance in which an emergency call is ongoing is generally less than the value of the cell selection timer that is utilized for a connection re-establishment procedure in instances in which an emergency call is not ongoing. In one embodiment in which the mobile terminal includes a predefined value for a shorter cell selection timer, the mobile terminal, such as the processor, may be configured to utilize the shorter of the predefined value or the value provided by the network for purposes of the shorter cell selection timer. Once the emergency call is terminated, the mobile terminal may discard or otherwise delete the parameters provided by the network node.

Although connection re-establishment procedures may be conducted during an ongoing emergency call as described above, such as in instances in which the time allotted for such connection re-establishment procedures is limited by a shorter cell selection timer, the method and apparatus of other embodiments may disallow efforts to re-establish a connection that was lost during an ongoing emergency call. In this embodiment as show in FIG. 4E, an emergency call may be ongoing. As such, the mobile terminal 10 may include means, such as the processor 20, for supporting an ongoing emergency call. See operation 400. Additionally, the mobile terminal of one embodiment may cause level 3 that supports the emergency call to inform level 2 of the ongoing emergency call. During the emergency call, an indication may be received that connection re-establishment has been triggered, such as in response to the radio connection being lost due to link failure or otherwise. As such, the mobile terminal may include means, such as the processor, receiver 16, antenna 12 or the like, for receiving the indication that a connection re-establishment procedure has been triggered. See operation 410. In this embodiment and in response to the indication that connection re-establishment has been triggered, the mobile terminal may move to an idle state. Thus, the mobile terminal of this embodiment may include means, such as the processor, for moving to the idle state. See operation 420. As a result of the movement to the idle state, a user of the mobile terminal would be required to initiate another emergency call. By quickly moving to the idle state, such as by moving to the idle state without awaiting expiration of the cell selection timer, e.g., by moving to the idle state immediately upon the connection re-establishment request being triggered, another emergency call may be initiated by the user in some instances more quickly than the connection that supported the prior emergency call could be re-established. While movement to the idle state may be accomplished in various manners, the mobile terminal, such as the processor, of one embodiment may cause the cell selection timer to expire upon receiving the indication that connection re-establishment has been triggered, thereby effectively moving to the idle state in an immediate fashion.

By appropriately handling an ongoing connection or a connection re-establishment procedure, an emergency call may be initiated and conducted in an efficient and expeditious manner. Thus, an emergency call may be treated with priority even in instances in which a connection re-establishment procedure is ongoing or may otherwise appear to compete with the initiation of an emergency call.

As described above FIGS. 4A-4E are flowcharts of an apparatus, method, and computer program product according to exemplary embodiments of the invention. As also described above, each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product that is performed by the mobile terminal 10, such as the user equipment 102, may be stored by one or more memory devices 40, 42 of the mobile terminal and executed by the processor 20 of the mobile terminal, while the computer program product that is performed by the network node 104 may be stored by one or more memory devices 122 of the network node and executed by the processor 120 of the network node. In some embodiments, the computer program instructions comprising the computer program product(s) which embody the procedures described above may be stored by memory devices of a plurality of computing devices, such as the network node and the mobile terminal. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., the network node 104 and the mobile terminal 10, such as the user equipment 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions for performing the specified functions. It will also be understood that one or more blocks of the flowchart, and combinations of blocks in the flowchart, may be implemented by special purpose hardware-based computer systems which perform the specified functions or combinations of special purpose hardware and computer program product(s).

The above described functions may be carried out in many ways. For example, any suitable means for carrying out each of the functions described above may be employed to carry out embodiments of the invention. In one embodiment, suitably configured processors 20, 120 of the mobile terminal 10 and the network node 104, respectively, may provide means for performing their respective functions, as shown in FIGS. 4A-4E and described above. In another embodiment, all or a portion of the operations, such as shown in FIGS. 4A-4E, may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing description and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, at a user equipment, an indication that an emergency call is to be initiated during a connection re-establishment procedure with a base station, wherein the receiving includes receiving an indication that an emergency call is to be initiated during an ongoing connection with the base station;
   terminating, at the user equipment, the connection re-establishment procedure with the base station in response to the indication that the emergency call is to be initiated and without awaiting expiration of a cell selection timer, wherein the terminating includes terminating the ongoing connection with the base station occurs without signaling a network;
   establishing, at the user equipment, another connection to support the emergency call, wherein a cell selected to support the emergency call is not suitable to support a connection sought to be re-established; and
   utilizing a shorter cell selection timer for a connection re-establishment procedure during an ongoing emergency call than in an instance in which an emergency call is not ongoing.

2. The method according to claim 1, wherein the terminating, at the user equipment, the ongoing connection or the connection re-establishment procedure with the base station comprises moving to an idle state.

3. The method according to claim 1, further comprising: releasing, at the user equipment, the another connection upon termination of the emergency call.

4. An apparatus comprising at least one processor and at least one memory including computer program code, the at least one memory and the computer program code configured to, with the at least one processor, cause the apparatus to at least:
   receive an indication that an emergency call is to be initiated during a connection re-establishment procedure with a base station, wherein receipt of an indication that an emergency call is to be initialed includes receiving an indication that an emergency call is to be initiated during an ongoing connection with the base station;
   terminate the connection re-establishment procedure with the base station in response to the indication that the emergency call is to be initiated and without awaiting expiration of a cell selection timer, wherein termination of the connection includes terminating the ongoing connection with the base station occurs without signaling a network;

establish another connection to support the emergency call, wherein a cell selected to support the emergency call is not suitable to support a connection sought to be re-established; and utilize a shorter cell selection timer for a connection re-establishment procedure during an ongoing emergency call than in an instance in which emergency call is not ongoing.

5. The apparatus of claim 4, wherein the terminating the ongoing connection or the connection re-establishment procedure with the base station comprises moving to an idle state.

6. The apparatus of claim 4, wherein the at least one memory and the computer program code are further configured to, with the at least one processor, cause the apparatus to at least release the other connection upon termination of the emergency call.

7. A non-transitory computer-readable medium including computer program code which when executed causes operations comprising:

receiving, at a user equipment, an indication that an emergency call is to be initiated during a connection re-establishment procedure with a base station, wherein the receiving includes receiving an indication that an emergency call is to be initiated during an ongoing connection with the base station;

terminating, at the user equipment, the connection re-establishment procedure with the base station in response to the indication that the emergency call is to be initiated and without awaiting expiration of a cell selection timer, wherein the terminating includes terminating the ongoing connection with the base station occurs without signaling a network;

establishing, at the user equipment, another connection to support the emergency call, wherein a cell selected to support the emergency call is not suitable to support a connection sought to be re-established; and utilizing a shorter cell selection timer for a connection re-establishment procedure during an ongoing emergency call than in an instance in which an emergency call is not ongoing.

8. The non-transitory computer-readable medium according to claim 7, wherein the terminating, at the user equipment, the ongoing connection or the connection re-establishment procedure with the base station comprises computer program code for moving to an idle state.

9. The non-transitory computer-readable medium according to claim 7, further comprising releasing, at the user equipment, the another connection upon termination of the emergency call.

* * * * *